Feb. 13, 1940.   F. L. CRADDOCK   2,190,231
THUMB LOLLIPOP
Filed Aug. 7, 1939
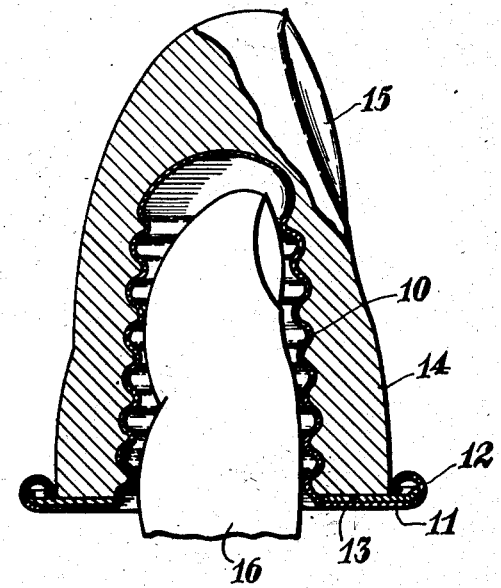
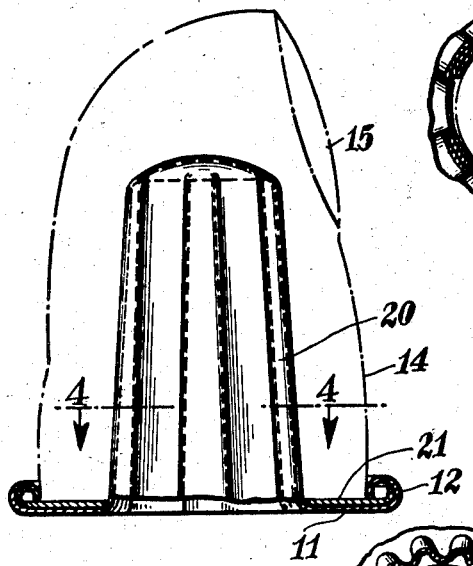
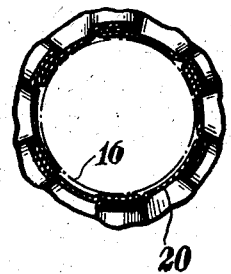
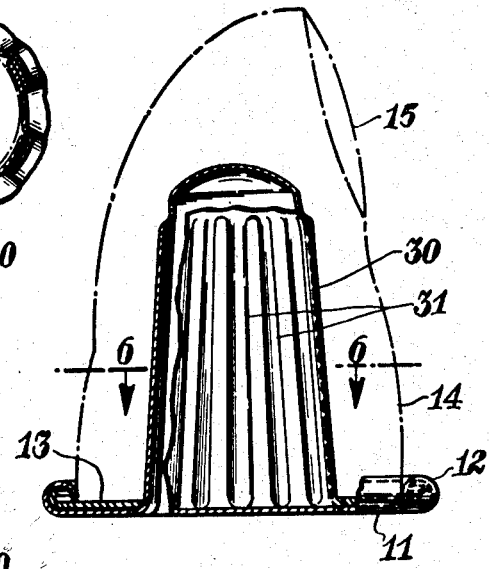
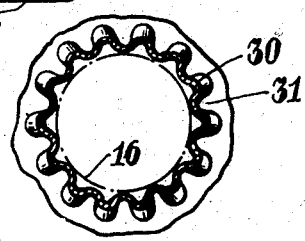
INVENTOR.
Frederick L. Craddock
BY
ATTORNEY.

Patented Feb. 13, 1940

2,190,231

UNITED STATES PATENT OFFICE 2,190,231

THUMB LOLLIPOP

Frederick L. Craddock, Wilmington, Del.

Application August 7, 1939, Serial No. 288,885

11 Claims. (Cl. 99—138)

The present invention relates to confections of the so called lollipop type.

The present practice in making "suckers" or lollipops is to force sharpened wooden sticks into the candy while in plastic state. Numerous instances have been reported of children being seriously injured, sometimes fatally, through falling down with a conventional lollipop in their mouth and driving the sharp sticks into the roofs of their mouths or other oral organs.

It is accordingly the major object of my invention to provide a form of lollipop which is attractive to children and which does not embody any sharp sticks or other projections and is therefore absolutely safe for a child to hold in its mouth while at play.

Another object is to provide a lollipop having a finger-receiving hole or recess, so that the candy may be carried upon the thumb or finger, and to provide a lining for the hole.

A further object is to provide a lollipop having a thumb-receiving recess and means for preventing the thumb from being soiled while the candy is being eaten.

Another object is to provide a lollipop which embodies a supporting structure adapted to be carried upon the thumb and designed to discourage "thumb-sucking."

Further objects will become apparent as the specification proceeds in connection with the annexed drawing, and from the appended claims.

In the drawing:

Figure 1 is a sketch of a boy sucking one of my thumb lollipops.

Figure 2 is an elevation, partly in section, of a thumb lollipop, provided with a thumb-receiving recess lined with a deformed and circumferentially corrugated waxed paper lining, and which extends outwardly to form a drip catching flange at the bottom of the candy.

Figure 3 is a view of a modified deformed lining having longitudinally folded corrugations, like those of the widely used paper cups known by the trade name of "Lily Cups."

Figure 4 is a section of the device of Figure 3 taken on the line 4—4 thereof.

Figure 5 is a view similar to Figure 2 but shows another modified form of deformed lining having longitudinal corrugations; and Figure 6 is a section of the device of Figure 5, taken on the line 6—6 thereof.

In Figure 2 a circumferentially corrugated waxed paper, closed top, tube shaped lining 10 is provided at its lower end with a flanged portion 11, terminating in a rolled edge 12. The latter secures a stiffening paper washer 13 in place. Washer 13 may, if desired, be made of absorbent material such as, for instance, blotting paper. The member 10 is surrounded by a candy member 14, which may, if desired, be colored or formed to imitate a thumb nail at its upper, right hand portion 15, or it may have any other desired external shape. The lower end of member 14 rests upon the member 13, and members 12 and 13 form a drip guard to prevent drippings from member 14, onto the child's thumb 16. Any suitable manufacturing method may be used. For instance the candy may be molded in plastic state upon members 10 and 13, or if desired the candy may be applied by a dip process. In either event the candy is mechanically interlocked with the holder and cannot come off.

The article is supported upon the users' finger in the manner of a thimble, as indicated in Figure 1.

The modification of Figures 3 and 4 differs from the device of Figure 2 in that the lining 20 is formed of a folded disc of paper in the same way that "Lily Cups" are made, except that member 20 is in addition provided with a drip catching washer 21.

The modification of Figures 5 and 6 resembles the device of Figure 3, except that the lining 30 is provided with longitudinal corrugations 31, in place of the circumferential corrugations of the device of Figure 2. It will be noted that the linings and thumb-openings are tapered so as to be larger at the bottom. This is to permit thumbs of various diameters to get a secure thumbhold, so that my lollipop thumbs will not have to be made in a variety of sizes for children of various ages. This feature is preferably used in all of the forms of the invention.

The linings may also be made of plain paper tubes, either cylindrical or tapered, but I prefer the deformed paper lining shown in Figures 2 to 6 in most cases because, among other reasons, the corrugations tend to hold the candy and lining together securely. Of the deformed paper linings, those of Figure 2 and Figures 5 and 6 can also be made when the proper machinery is available.

Although I have described the holders of my invention as being made of waxed paper, they may be made of any other suitable material such as thin metal, metal foil, foil covered paper or plain paper, without departing from the spirit of the invention. They may also be used for marketing ice cream, and other edibles capable of being held in place thereon.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A candy lollipop provided with a thumb-receiving recess, a deformed lining for said recess, and a drip flange at the lower end of said lining.

2. A candy lollipop having a body of a size suited to be enveloped by the lips of a user and a thumb-receiving recess provided with a lining, in the body, said recess having a limited cross section whereby the surrounding portion of the body is of substantial thickness.

3. A candy lollipop having a body of a size suited to be enveloped by the lips of a user, and a thumb-receiving recess provided with a lining, in the body, said recess having a limited cross section, whereby the surrounding portion of the body is of substantial thickness, and a drip flange at the outer end of the lining.

4. A candy lollipop having a body of a size suited to be enveloped by the lips of a user, said body having a thumb-receiving recess provided with a paper lining, said recess having a limited cross section, whereby the surrounding portion of the body is of substantial thickness.

5. A candy lollipop having a body of a size suited to be enveloped by the lips of a user, said body having a thumb-receiving recess provided with a lining of corrugated material, said recess having a limited cross section, whereby the surrounding portion of the body is of substantial thickness.

6. A candy lollipop having a body of a size suited to be enveloped by the lips of a user, said body having a thumb-receiving recess provided with a folded lining, the aperture of the thumbhold having a limited cross section, whereby the surrounding portion of the body is of substantial thickness.

7. A candy lollipop having a body of a size suited to be enveloped by the lips of a user, and a tapered thumbhole provided with a lining, in the body, the aperture of the thumbhole having a limited cross section, whereby the surrounding portion of the body is of substantial thickness.

8. A lollipop having an edible body of a size adapted to be enveloped by the lips of a user, said body having a recess therein provided with a lining member, said recess and said lining member being of sufficient diameter and length to enable said body to be supported upon the finger of a user in the manner of a thimble.

9. The article of manufacture defined in claim 8, wherein said recess and said lining member taper outwardly to enable the body to be tightly fitted upon fingers of various sizes.

10. A lollipop comprising an edible body of a size adapted to be enveloped by the lips of a user and a supporting structure having a recess adapted to be fitted over the finger of a user, said edible body surrounding said supporting structure and being rigidly secured thereto.

11. The lollipop defined in claim 10, wherein said supporting structure is provided with an outwardly extending flange adjacent the open end of said recess for protecting the finger of the user against drippings from the body.

FREDERICK L. CRADDOCK.